(12) United States Patent
Yamanaka

(10) Patent No.: US 7,040,821 B2
(45) Date of Patent: May 9, 2006

(54) PRINT CONTROLLER FOR REDUCING DOCUMENT DATA TO BE PRINTED ON SHEET

(75) Inventor: Tsuyoshi Yamanaka, Komaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 77 days.

(21) Appl. No.: 10/926,982

(22) Filed: Aug. 27, 2004

(65) Prior Publication Data

US 2005/0058486 A1 Mar. 17, 2005

(30) Foreign Application Priority Data

Aug. 29, 2003 (JP) ............................. 2003-305685

(51) Int. Cl.
*B41J 11/44* (2006.01)

(52) U.S. Cl. ............................. 400/76; 400/61; 400/62; 358/1.15; 358/1.12

(58) Field of Classification Search ................. 400/61, 400/62, 70, 76; 358/1.12, 1.15, 1.18, 1.2
See application file for complete search history.

(56) References Cited

U.S. PATENT DOCUMENTS

| 6,417,931 | B1 | 7/2002 | Mori et al. | ................. 358/1.15 |
| 6,580,521 | B1 * | 6/2003 | Nishikawa et al. | ........ 358/1.18 |
| 2001/0024291 | A1 | 9/2001 | Mori et al. | ................. 358/1.12 |

FOREIGN PATENT DOCUMENTS

JP         A 11-99724         4/1999

* cited by examiner

*Primary Examiner*—Minh Chau
(74) *Attorney, Agent, or Firm*—Oliff & Berridge, PLC

(57) ABSTRACT

A print controller is capable of printing document data within a printable area without generating unnecessary spaces on the sheet, even when the printable area of the sheet has been modified. The print controller includes a function for acquiring the sheet size from the printer driver based on the size set by a sheet size setting function. Specifically, the sheet data acquiring function transmits the sheet size set by the sheet size setting function to the printer driver via a graphics engine. The printer driver calculates the printable area of the sheet based on the sheet size set by the application. The printer driver returns the calculated area to the application. The area returned to the application is then used as a virtual print area used only in processes performed by the application. The print controller has another function for creating a layout based on the virtual print area. That is, the application recognizes the dimensions of the virtual print area received from the printer driver as the printable area and creates the layout based on this area.

17 Claims, 17 Drawing Sheets

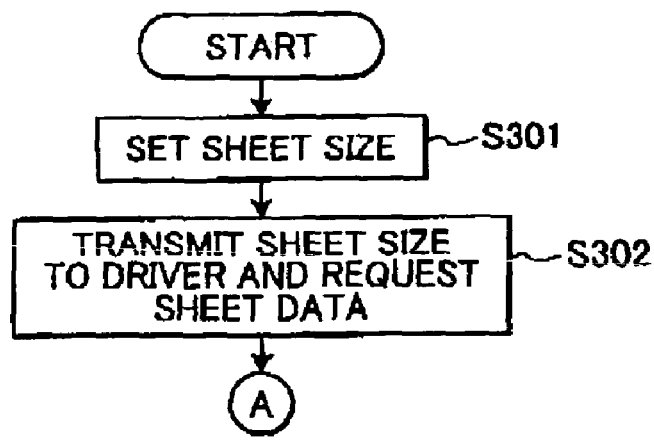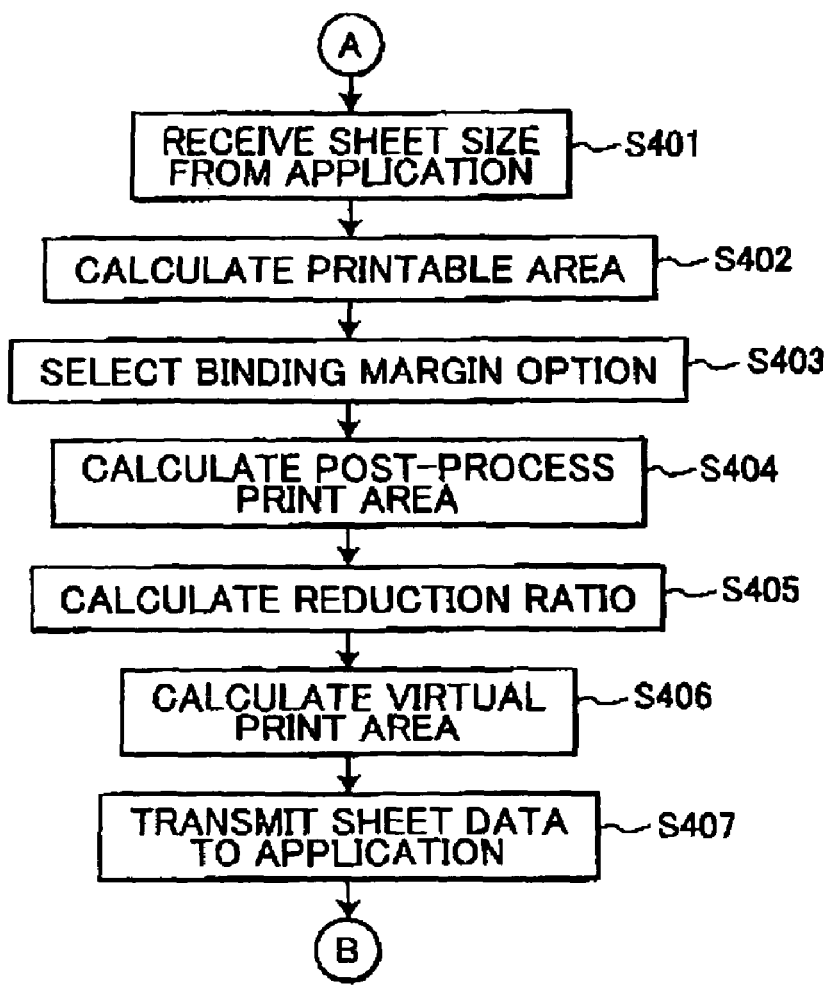

PRINT CONTROLLER FOR REDUCING DOCUMENT DATA TO BE PRINTED ON SHEET

BACKGROUND OF THE INVENTION

1. Field of the Invention

The present invention relates to a print controller capable of printing documents while maintaining an aspect ration thereof without wasting a sheet, even when the printable area on the sheet is modified.

2. Description of the Related Art

Japanese unexamined patent application publication No. 11-99724 discloses a print layout device that reduces the print data so that the data can be arranged within the printable area of the sheet, when setting margins to accommodate bindings.

This print layout device includes means for setting the margins for the sheet; means for calculating the printable area on the sheet based on the margins set by the setting means; means for enlarging or reducing the print data to fit the calculated printable area to the printable area; and means for laying out the enlarged or reduced print data according to the specified margins and for controlling the printer to print according to this layout. The enlarging/reducing means of this print layout device is configured to enlarge or reduce the print data while maintaining the aspect ratio of the original print data.

SUMMARY OF THE INVENTION

However, the conventional technology described above has the following problem. Spaces with no printing are often formed in the top and bottom or left and right portions of the layout because the image data is enlarged or contracted while maintaining the aspect ratio.

In view of the foregoing, it is an object of the present invention to provide a print controller capable of laying out print data for documents in the printable area and controlling the printing operation to avoid the generation of unnecessary space on the sheet.

The print controller according to the present invention is characterized by including: a first area calculating unit that subtracts an unprintable area from a sheet to calculate a first area having a prescribed aspect ratio; a margin setting unit that sets a margin in the sheet; a second area calculating unit that subtracts an overlapped area between the margin and the first area from the first area to calculate a second area: a reduction ratio calculating unit that calculates a reduction ratio of the first area so that the first area can be reduced while maintaining the prescribed aspect ratio to achieve a maximum occupation within the second area; a third area calculating unit that divides the second area by the reduction ratio to calculate a third area which is broader than the second area; a laying out unit that sets the third area as a printable area to lay out document data within the third area; and a first print commanding unit that reduces the document data laid out in the third area by the reduction ratio to issue a command for printing the reduced document data on the second area.

The print controller according to the present invention is characterized by including: a first area calculating unit that subtracts an unprintable area from a sheet to calculate a first area having a prescribed aspect ratio; a divided print setting unit that selects a divided print to print on an area of the sheet divided by a number of N; a second area calculating unit that multiplies the first area by a ratio of 1/N to calculate a second area; a reduction ratio calculating unit that calculates a reduction ratio for the first area so that the first area can be reduced while maintaining the aspect ratio to achieve a maximum occupation in the second area; a third area calculating unit that divides the second area by the reduction ratio to calculate a third area which is broader than the second area: a laying out unit that lays out document data in the third area as a printable area; and a first print commanding unit that reduces the document data in the third area laid out by the laying out means by the reduction ratio to issue a command to print the reduced document data in the second area.

The print controller according to the present invention is characterized by including: means for subtracting an unprintable area from a sheet to obtain a printable area having an aspect ratio, the unprintable area having a width; means for setting a desired printing area within the printable area; means for calculating a reduction ratio for the printable area so that the printable area can be reduced while maintaining the aspect ratio to achieve a maximum occupation within the desired printing area means for dividing the desired printing area by the reduction ratio to obtain a virtual area; means for laying out document data with the virtual area; and means for reducing the virtual area including the laid out document data by the reduction ratio to issue a command to print the reduced document data on the desired printing area.

BRIEF DESCRIPTION OF THE DRAWINGS

The above and other objects, features, and advantages of the invention will become more apparent from reading the following description of the preferred embodiments taken in connection with the accompanying drawings in which:

FIG. 3 is a flowchart showing the steps in a process executed by an application 30 to request sheet data from a printer driver 50, FIG. 4 is a flowchart showing the steps in a process executed by the printer driver 50 in response to a sheet size received from the application 30;

DESCRIPTION OF THE PREFERRED EMBODIMENTS

Figure 1:
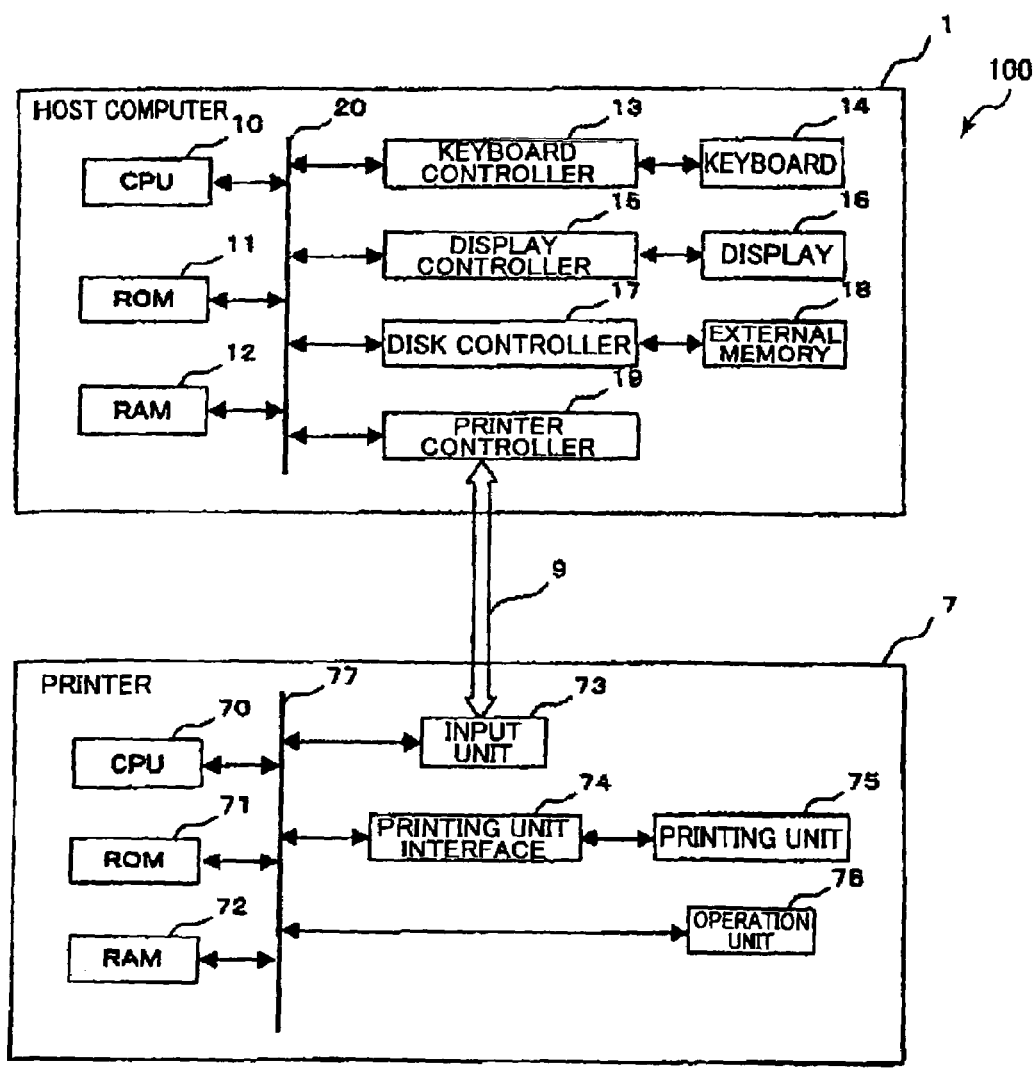
FIG. 1 is a block diagram showing the structure of a printing system 100 according to the present invention.

The preferred embodiments of the present invention will be described while referring to the drawings.

The configuration of a printing system 100 according to the present invention will be described with reference to the block diagram of FIG. 1.

The printing system 100 includes a host computer 1 and a printer 7. The host computer 1 and the printer 7 are connected via a communication cable 9.

The host computer 1 includes a CPU 10, a ROM 11, a RAM 12, a keyboard controller 13, a display controller 15, a disk controller 17, and a printer controller 19. The above components of the host computer 1 are connected to a system bus 20. The host computer 1 further includes a keyboard 14 connected to the keyboard controller 13, a display 16 connected to the display controller 15, and an external memory 18 connected to the disk controller 17.

The CPU 10 is a central processing unit for controlling overall operations of each component which is connected to the system bus 20. The CPU 10 executes a document creation process to create a document including text, photographs, or graphics based on a word processing program stored in the ROM 11.

The CPU 10 receives commands that a user indicates through a mouse cursor on the display 16 and then opens various windows registered for the command to execute different data processes. To execute a printing process using the printer 7, the user can open a printer option window to set options for a printer driver 50 (not shown)

The ROM 11 stores an operating system (OS) program for controlling the CPU 10; various programs for word processing, and data for fonts used in word processing.

The RAM 12 primarily functions as a work area that the CPU 10 uses when the CPU 10 executes the various programs stored in the ROM 11.

The keyboard controller 13 controls input from keys on the keyboard 14. The display controller 15 controls the content displayed on the display 16. The disk controller 17 controls memory accesses between the CPU 10 and the external memory 18. The printer controller 19 executes a communication control process to control communications between the host computer 1 and the printer 7.

The keyboard 14 includes various keys. The display 16 displays text, photographs, or graphics. The external memory 18 is configured of a hard disk for storing the printer driver 50.

Next, the components of the printer 7 will be described. The printer 7 includes a CPU 70, a ROM 71, a RAM 72, an input unit 73, a printing unit interface 74, and an operating unit 76. The above components of the printer 7 are connected to a system bus 77. The printer 7 further includes a printing unit 75 connected to the printing unit interface 74.

The CPU 70 is a central processing unit for controlling the overall functions of all components which are connected to the system bus 77. The CPU 70 outputs image signals to the printing unit 75 as output data based on control programs stored in the ROM 71. The CPU 70 can also communicate with the host computer 1 via the input unit 73 in order to notify the host computer 1 of information regarding the printer 7.

The ROM 71 stores control programs for the CPU 70 and data for fonts used when the printer 7 creates output data. The RAM 72 functions as a work area for the CPU 70.

The input unit 73 facilitates data transmission and reception between the printer 7 and the host computer 1. The printing unit interface 74 facilitates data transmission and reception between the CPU 70 and the printing unit 75. The printing unit 75 performs printing operations under the control of the CPU 70. The operating unit 76 includes switches and a display for facilitating various operations.

Figure 2:
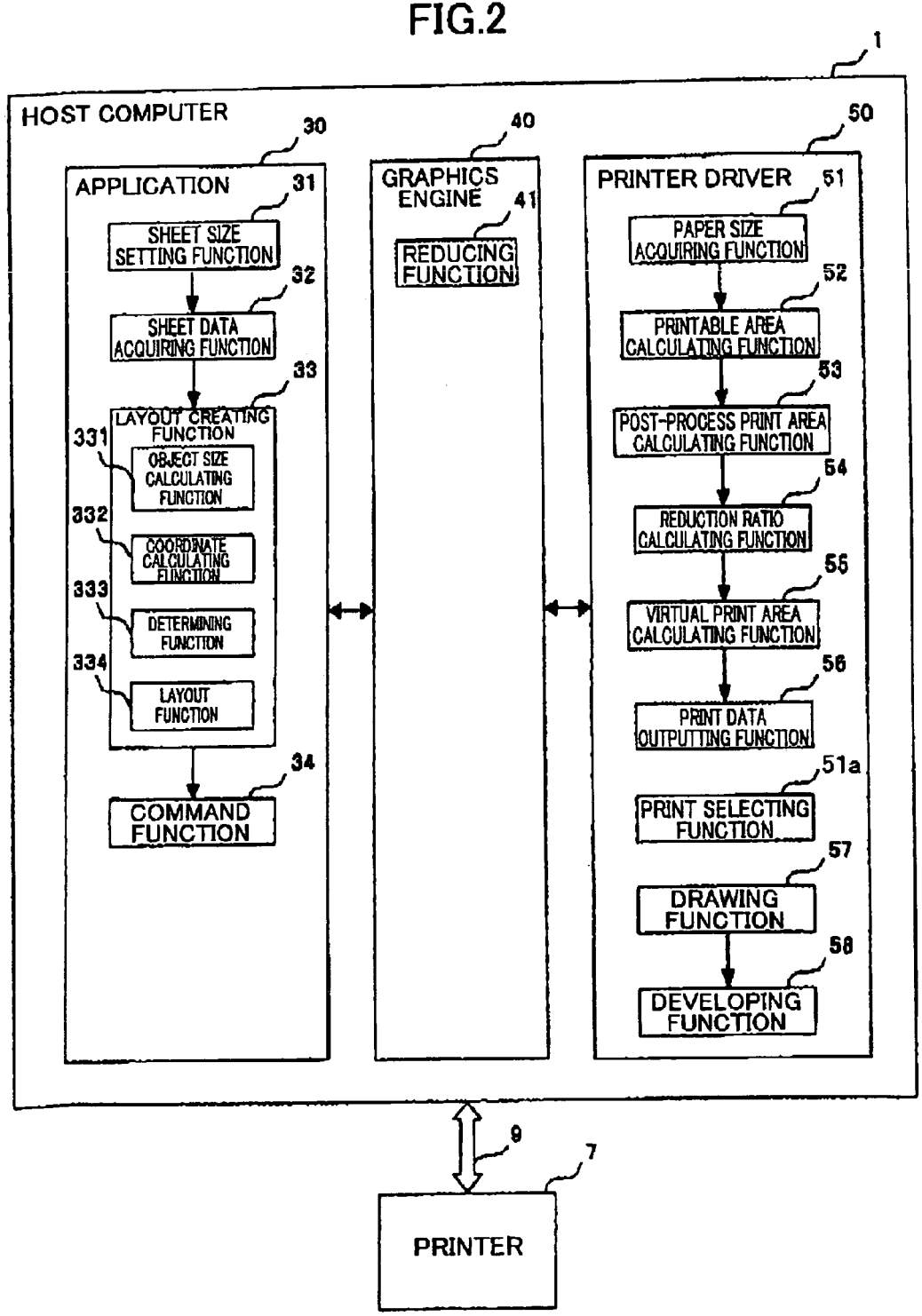
FIG. 2 is a block diagram showing the functions implemented by a CPU 10 under different programs stored in an external memory 18.

FIG. 2 is a block diagram showing functions that the CPU 10 implements by various programs stored in the external memory 18.

As shown in FIG. 2, the host computer 1 includes an application 30, a graphics engine 40, and the printer driver 50 that are stored in the external memory 18 of FIG. 1. The application 30, the graphics engine 40, and the printer driver 50 are programs which are loaded into the RAM 12 and executed by the OS.

The application 30 and the printer driver 50 can be stored in the hard disk of the external memory 18 from a floppy (registered trademark) disk or a CD-ROM. The application 30 which is stored in the external memory 18 is loaded the RAM 12 and executed. Similarly, the graphics engine 40 has been loaded to the RAM 12 and ready for the implementation. A printing process is performed by using the graphics engine 40 when the application 30 issues a print command to the printer 7 to perform a printing operation.

During the printing process, both the graphics engine 40 and the printer driver 50, which is provided for the printer 7, are loaded from the external memory 18 into the RAM 12. Output from the application 30 is sent to the printer driver 50. The graphics engine 40 converts functions received from the application 30 into functions for the printer driver 50 and outputs the converted functions. The printer driver 50 converts the functions received from the graphics engine 40 into control commands such as a Page Description Language (PDL) which can be recognized by the printer 7. The converted control commands are sent to the printer 7 via an interface by the OS.

Next, the functions of the application 30, the graphics engine 40, and the printer driver 50 will be described in detail.

The application 30 is executed by the host computer 1 to implement the following functions. As shown in FIG. 2, the application 30 implements, a sheet size setting function 31, a sheet data acquiring function 32, a layout creating function 33, and a command function 34.

The sheet size setting function 31 sets the size of sheet used for word processing through user operations. After starting the application 30 to create a document, the user opens a window on the screen and sets the size of the document through the sheet size setting function 31.

The sheet data acquiring function 32 acquires data related to the sheet size from the printer driver 50 based on the sheet size set by the sheet size setting function 31. This sheet size data includes the dimensions of the sheet, and dimensions of the area within the sheet that can actually be printed by the printer 7. Hereinafter, this data will be referred to as sheet data. Specifically, the sheet data acquiring function 32 transmits the sheet size set by the sheet size setting function 31 to the printer driver 50 via the graphics engine 40. The printer driver 50 calculates the area within the sheet that the printer 7 can print based on the sheet size set by the application 30. The printer driver 50 returns the calculated area to the application. In this embodiment, the printable area returned to the application 30 is a virtual area used only in processes performed by the application 30. Hereinafter, this virtual area will be referred to as a virtual print area.

The layout creating function 33 actually lays out a user-created document in the virtual print area acquired from the sheet data acquiring function 32. The layout creating function 33 includes an object size calculating function 331, a coordinate calculating function 332, a determining function 333, and a layout function 334. These functions calculate the size of each of objects in the document and then compare the size of the object to the size of the virtual print area to create a layout. In the present invention, an object refers to text, photographs, or graphics included in the document.

The command function 34 issues a command to the printer driver 50 to perform a print according to the layout created by the layout creating function 33. Based on the command from the command function 34, the layout created by the layout creating function 33 is sent to the printer 7 via the graphics engine 40 and the printer driver 50 to be printed by the printer 7. Alternatively, the command function 34 issues a command to the printer driver 50 to perform document data generated by the application 30 in response to the user operation.

The graphics engine 40 is executed by the host computer 1 to implement a reducing function 41. The graphics engine 40 stores reduction ratios calculated in the printer driver 50. When the command function 34 issues a command to the printer driver 50, the reducing function 41 reduces the layout created by the layout creating function 33 by the reduction ratio. Alternatively, the reducing function 41 reduces document data sent from the application 30.

The printer driver 50 is controlled by the host computer 1 to implement a printing option setting function 51a, a sheet size acquiring function 51, a printable area calculating function 52, a post-process print area calculating function 53, a reduction ratio calculating function 54, a virtual print area calculating function 55, a print data outputting function 56, a drawing function 57, and a developing function 58.

The printing option setting function 51a is activated by the user operation. When executing a printing operation after creating a document; a user can open a window on the display 16 and select one of the printing options.

The printing options include three (3) options: a binding margin option, an N-in-1 print option, and a simple scaling option. The binding margin option is the operation by which a binding margin is established on a sheet when the sheet is printed. The N-in-1 print option is the operation in which one sheet is divided into N equal portions and document data is reduced and positioned in each of the N areas so that N pages worth of document data can be printed on a single sheet. The simple scaling option is the operation in which the document data to be printed on one page is enlarged or reduced while maintaining an aspect ration thereof and then printed on a sheet. When selecting the binding margin, the user opens a window on the display 16 and performs the binding setting using the process setting function 51a. When selecting the N-in-1 print, the user opens a window on the display 16 and performs the N-in-1 print setting using the process setting function 51a. When selecting the simple scaling option, the user opens a window on the display 16 and performs the scaling setting using the process setting function 51a.

The sheet size acquiring function 51 acquires the sheet size that has been set by the sheet size setting function 31.

The printable area calculating function 52 references the sheet size acquired by the sheet size acquiring function 51 to calculate the printable area of the sheet size. The printable area is calculated by subtracting areas that cannot be printed by the printer 7 (hereinafter referred to as unprintable areas) from the dimensions of the sheet. The unprintable areas are inherent in the printer 7 and are possessed by the printer driver 50.

The post-process print area calculating function 53 calculates the area on a sheet on which the document data created on the application 30 can be actually printed in accordance with the selected option. Hereinafter, the area calculated by the post-process print area calculating function 53 will be referred to as the post-process print area. When the binding margin option is selected, the post-process print area is calculated by subtracting the overlapped area between the printable area and the binding area from the printable area. When the N-in-1 print option is selected, the post-process print area is calculated by dividing the printable area by the numeral: N.

The reduction ratio calculating function 54 calculates a reduction ratio to reduce and achieve the maximum occupation of the printable area in the post-process print area while maintaining the aspect ratio of the printable area.

The virtual print area calculating function 55 divides the post-process print area by the reduction ratio to calculate a virtual print area. The resultant area is defined as a virtual print area.

The print data outputting function 56 transmits the dimensions of the virtual print area and the dimensions of the virtual sheet that includes the virtual print area (hereinafter referred to as a virtual sheet size) to the application 30. The transmitted data also includes the reduction ratio calculated by the reduction ratio calculating function 54. This reduction ratio is stored on the graphics engine 40 when transmitted to the application 30.

The drawing function 57 receives commands issued by the command function 34 in the application 30 via the graphics engine 40 and interprets the content of the commands.

The developing function 58 develops (rasterizes) the content of the commands interpreted by the drawing function 57 into PDL which can be interpreted by the printer 7. The PDL data developed by the developing function 58 is subsequently transmitted to the printer 7 via the communication cable 9.

In this embodiment, a print command function is configured of the command function 34, the reducing function 41, the drawing function 57, and the developing function 58.

Next, the first embodiment of the operations implemented by the host computer 1 will be described in detail with reference to the flowcharts in FIGS. 3, 4, and 9–11. First, the operation will be described when the user selects the binding margin option. FIG. 3 is a flowchart showing a process by the application 30 to request sheet data from the printer driver 5.

In step 301, the sheet size setting function 31 sets the sheet size of the document. The sheet size is set through the user operations. More specifically, the user opens a sheet size setting window on the display 16 and then sets the sheet size.

In S302 the sheet data acquiring function 32 of the application 30 transmits the sheet size set by the sheet size setting function 31 to the printer driver 50 via the graphics engine 40 to request the sheet data corresponding to this sheet size. The process by the application 30 is finished. Subsequently, the process advances to S401 of FIG. 4.

FIG. 4 is a flowchart showing steps in a process performed by the printer driver 50 in response to the sheet size received from the application 30.

In S401 the sheet size acquiring function 51 of the printer driver 50 receives the sheet size from the application 30.

In S402 the printable area calculating function 52 calculates the printable area that is predetermined for the acquired sheet size. The printable area is defined by subtracting the unprintable areas from the area of the sheet. The unprintable areas are areas that the printer 7 cannot print on in a printing process, and inevitably remain blank.

Figure 5:
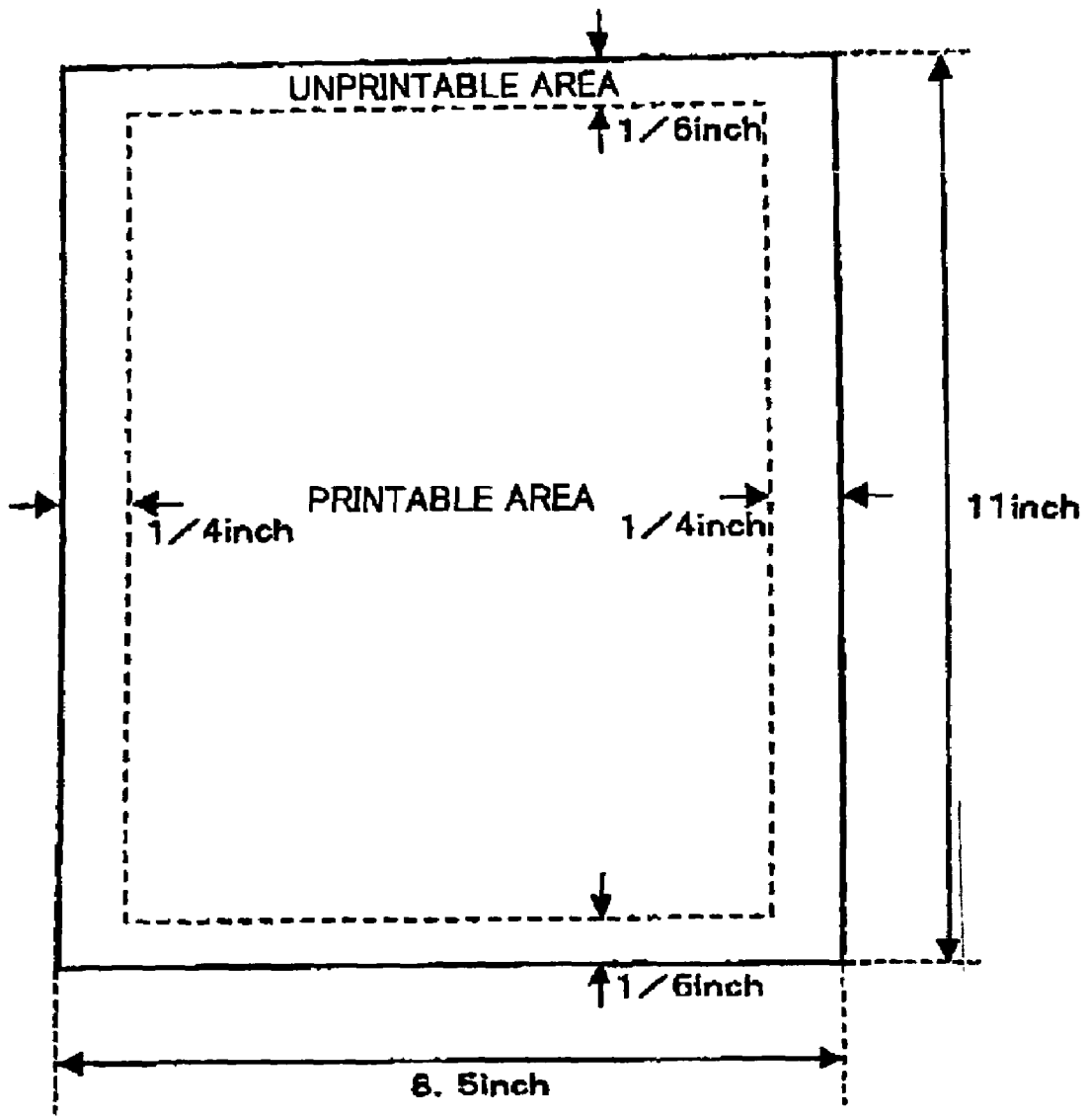
FIG. 5 is a plan view showing an example of a printable area.

FIG. 5 is a plan view showing an example of the printable area. As shown in FIG. 5, the dimensions of the sheet are indicated as 11 inches vertically and 8.5 inches horizontally, where one inch is equivalent to 2.54 cm. Since the dimension of the unprintable area on the top and bottom of the sheet is 1/6 inches and the dimension of the unprintable area on the left and right sides of the sheet is 1/4 inches then the dimensions of the printable area are 8 inches horizontally (8.5 inches–2/4 inches) and 64/6 inches vertically (11 inches–2/6 inches).

In S403 the binding option is selected by the user operation through the print option setting function 51a. The print option setting function 51a establishes a binding margin and asks the user to enter the width and the place on the sheet.

Figure 6:
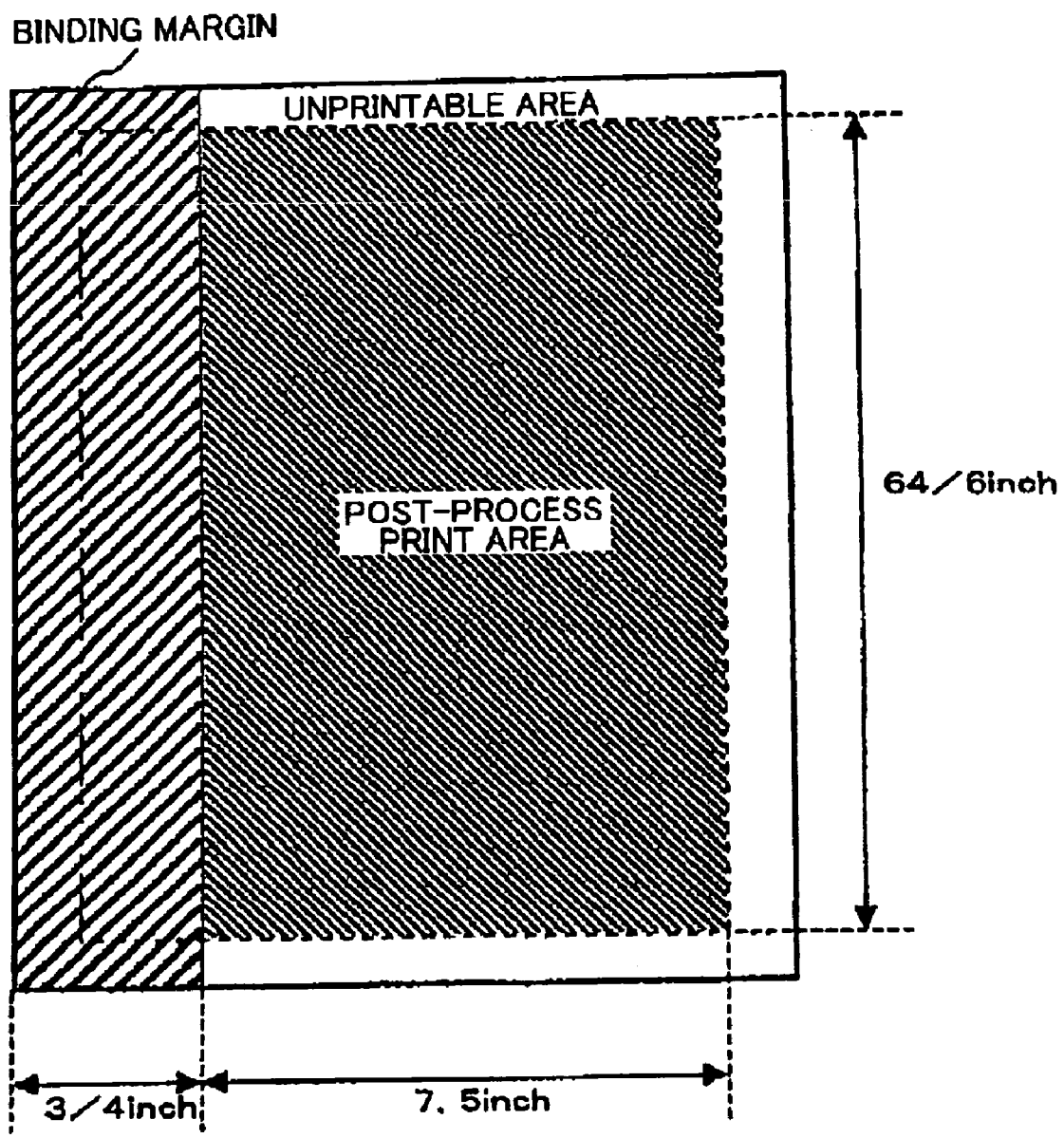
FIG. 6 is a plan view showing an example post-process print area according to the first embodiment.

In S404 the post-process print area calculating function 53 calculates the area that can actually be printed within the printable area when the binding option has been set. The above area is defined as s post-process print area. When the user has selected the binding option, the post-process print area is obtained by subtracting the overlapped area between the printable area and the binding area from the printable area. FIG. 6 is a plan view showing an example of the post-process print area. As shown in FIG. 6, the binding area is indicated with a width of 3/4 inches. In this embodiment, the post-process print area is obtained at 7.5 inches horizontally (8.5 inches–1 inch), and 64/6 inches vertically.

In S405 the reduction ratio calculating function 54 calculates the reduction ratio for the printable area in order that the printable area can be reduced maintaining the aspect ratio thereof in order to achieve the maximum occupation within the post-process print area. The reduction ratio is required to be calculated while maintaining the aspect ratio of the printable area.

Figure 7:
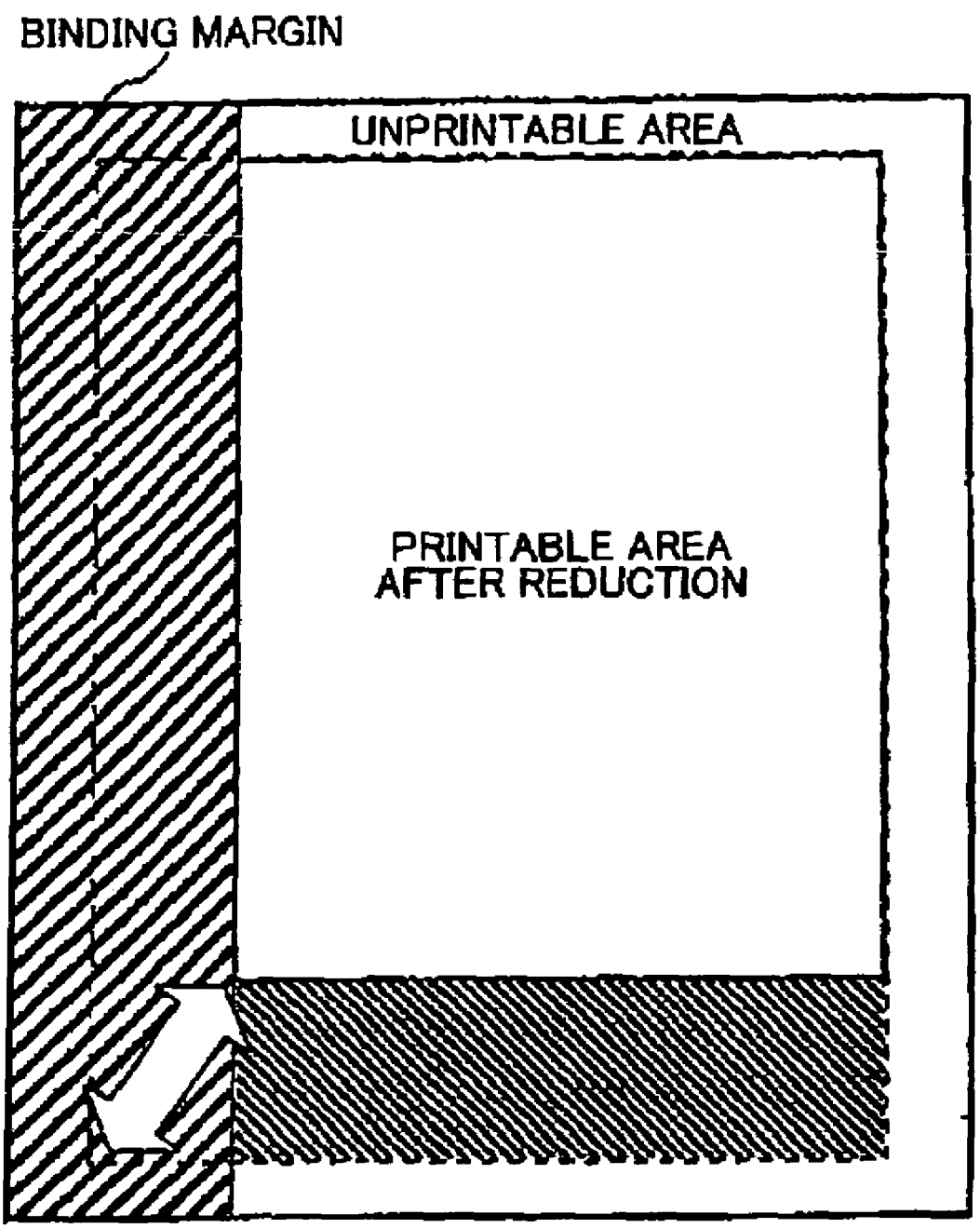
FIG. 7 is an explanatory diagram showing the printable area according to the first embodiment that has been reduced while maintaining the aspect ratio thereof.

FIG. 7 is a plan view showing the printable area that has been reduced while maintaining the aspect ratio. The aspect ratio of the post-process print area is generally changed from the aspect ratio of the printable area, after the binding area is removed from the printable area. When the post-process print area of FIG. 6 is compared to the printable area of FIG. 5, only the widthwise dimension of the post-process print area has decreased from the widthwise dimension of the printable area. In order to calculate the reduction ratio, it is understandable that the 7.5-inch width dimension of the post-process print area is divided by the 8-inch width dimension of the printable area. Thus, the reduction ratio is obtained as 75/80 in this embodiment.

Figure 8:
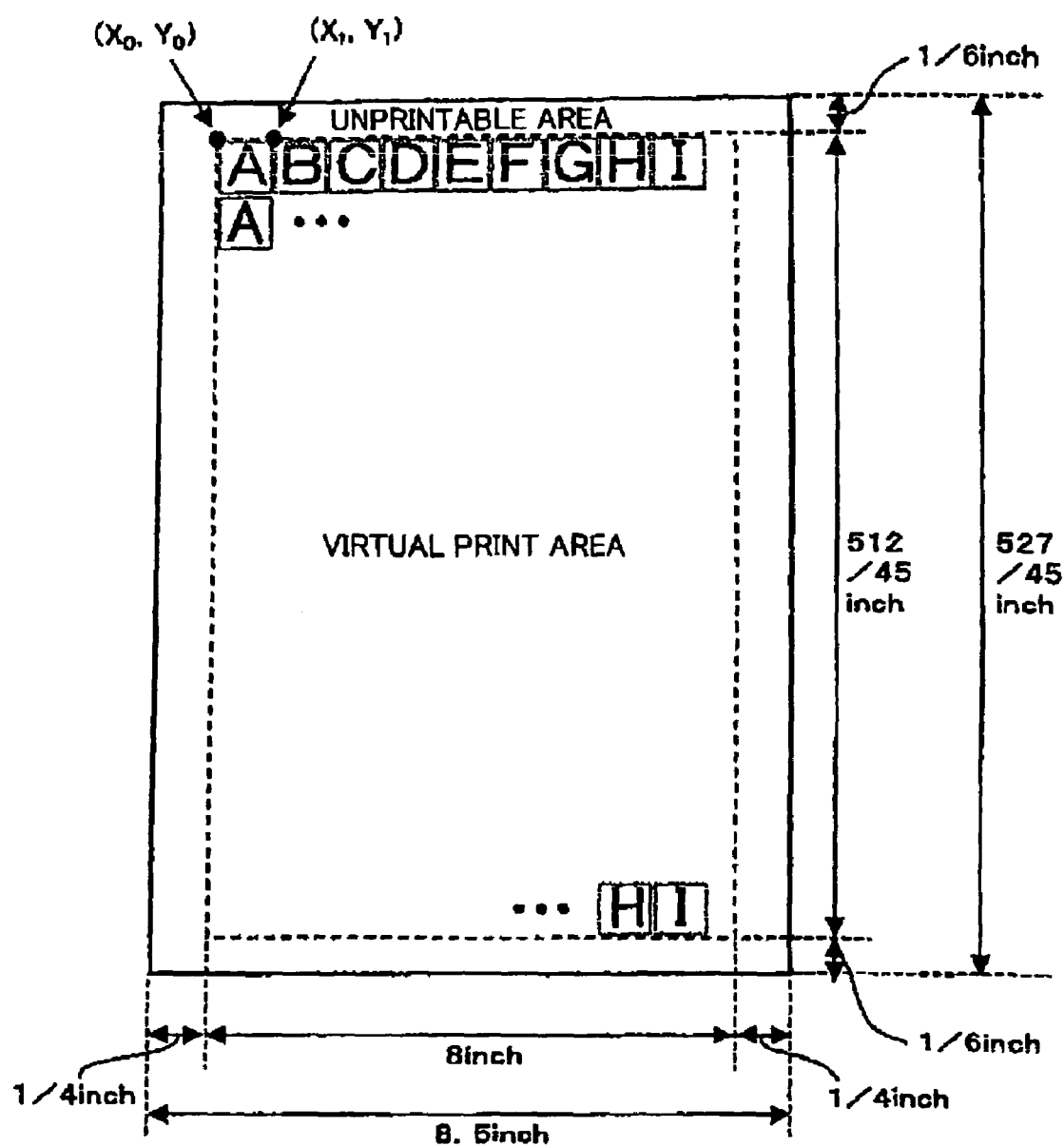
FIG. 8 is an explanatory diagram showing a virtual print area according to the first embodiment.

In S406 the virtual print area calculating function 55 calculates the virtual print area by dividing the post-process print area by the reduction ratio calculated by the reduction ratio calculating function 54. FIG. 8 is a plan view showing the virtual print area. In this embodiment, the 7.5-inch width and 64/6-inch length of the post-process print area is divided by the aforementioned reduction ratio of 75/80, respectively. As a result, the virtual print area is calculated to have an 8 inch horizontal width and a 512/45 inch vertical length.

In S407 the reduction ratio, the dimensions of the virtual print area, and the dimensions of the virtual sheet size are sent as sheet data to the application 30 via the graphics engine 40. The virtual sheet size is defined by adding the aforementioned unprintable areas (1/6 inches on the top and bottom and 1/4 inches on the left and right) to the top, bottom, left, and right of the virtual print area calculated by the virtual print area calculating function 55. Specifically, the dimensions of the virtual sheet size are set to a width of 8.5 inches and a height of 527/45 inches, as shown in FIG. 8. When this data is sent to the application 30, the reduction ratio is stored on the graphics engine 40. Subsequently, the process advances to S501 of FIG. 9.

Figure 9:
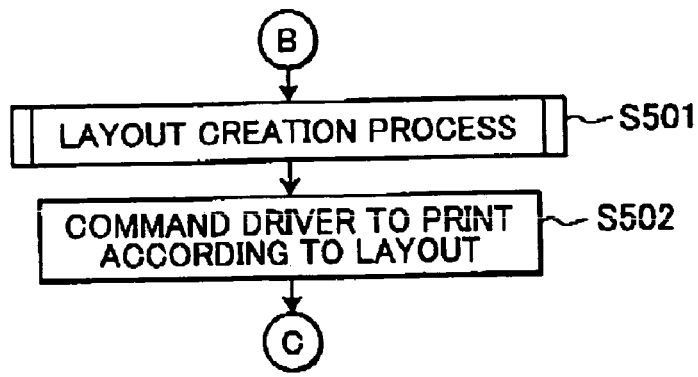
FIG. 9 is a flowchart showing the steps in a process by the application 30 to lay out document data, create a layout, and issue a print command to the printer driver 50.

FIG. 9 is a flowchart showing the steps of a process executed by the application 30 to create a layout for document data and issue a print command to the printer driver 50.

At the beginning of this process, a layout creation process is executed in S501. The layout is created based on the virtual print area described above. The application 30 recognizes the dimensions of the virtual sheet size received from the printer driver 50 as the actual dimensions of the sheet that will be printed by the printer 7, and further recognizes the actual dimensions of the virtual print area as the area that can be printed by the printer 7. The layout creation process of S501 will be described in detail below with reference to FIG. 10.

Figure 10:
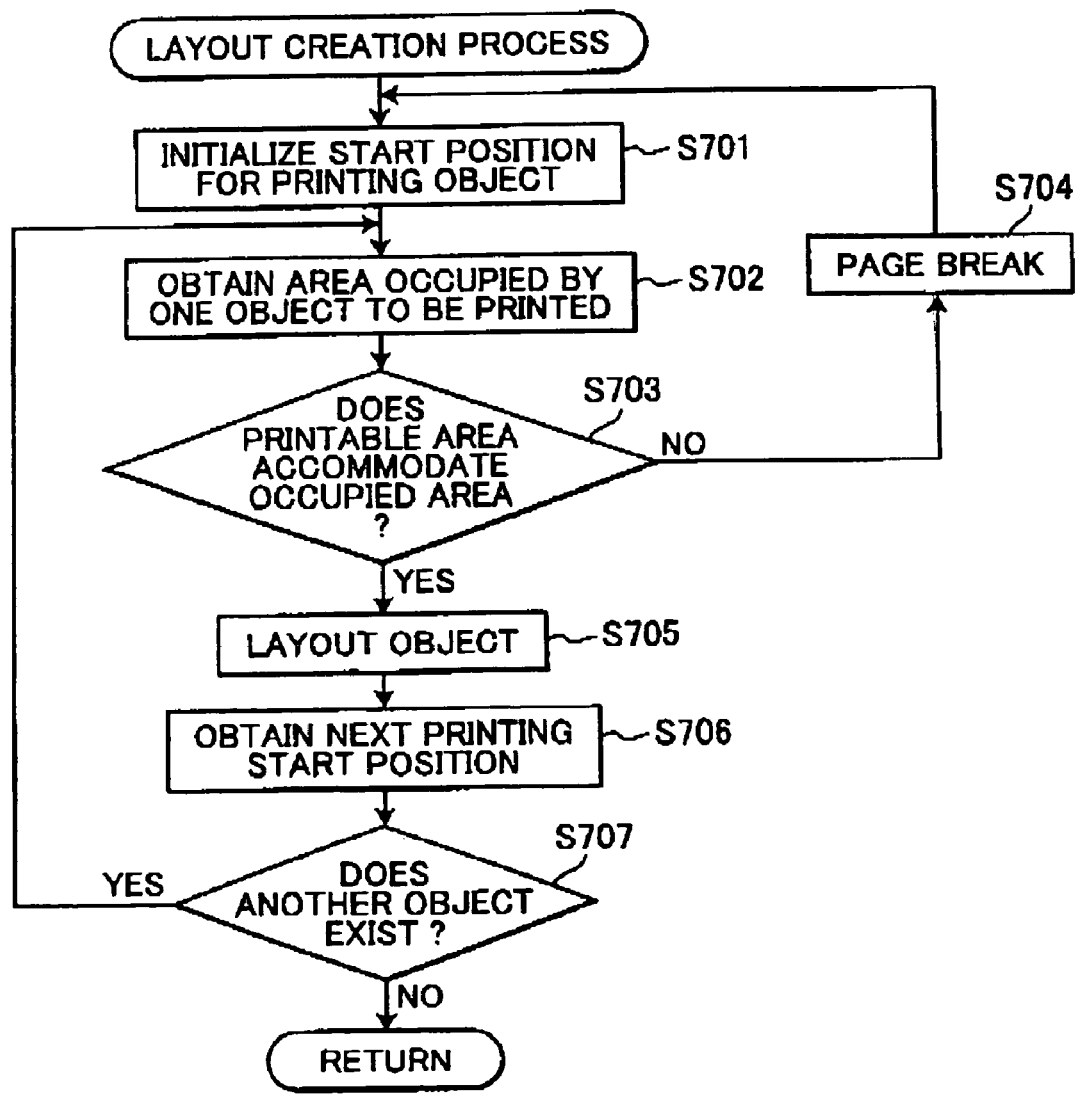
FIG. 10 is a flowchart showing steps in a layout creation process of FIG. 9.

In FIG. 10, the layout creation process is executed by the layout creating function 33.

In S701 the layout creating function 33 calculates a printing start position on the sheet. The printing start position is calculated by the coordinate calculating function 332 based on the virtual print area acquired by the sheet data acquiring function 32. Specifically, the printing start point is assigned to the point of the coordinates $(X_0, Y_0)$ in the upper left corner of the virtual print area, as shown in FIG. 8.

In S702 the layout creating function 33 calculates the area occupied by the first object to be laid out in the virtual print area. The occupied area of the object is calculated by the object size calculating function 331.

In S703 the layout creating function 33 determines whether the virtual print area can accommodate the occupied area calculated above. Specifically, the layout creating function 33 determines whether the virtual print area can accommodate the area occupied by the object when the object is placed with reference to the coordinates $(X_0, Y_0)$ calculated by the coordinate calculating function 332. If the layout creating function 33 determines that the virtual print area does not accommodate the object (S703: NO), then a page break is inserted in S704 and the process of S701 is executed on a new page. On the other hand, if the layout creating function 33 determines that the virtual print area accommodates the object (S703: YES), in S705 the object is laid out with reference to the point of the coordinates $(X_0, Y_0)$. The above layout process is executed by the layout function 334.

In S706 the coordinate calculating function 332 calculates a printing start position $(X_1, Y_1)$ for laying out the next object.

In S707 the layout creating function 33 determines whether another object exists in the document data. If the layout creating function 33 determines that another object exists in the document data (S707: YES), then the layout creating function 33 returns to S702 to calculate the area occupied by the next object, and repeats the process described above. On the other hand; if the layout creating function 33 determines that no other object exists in the document data (S707: NO), then the layout creation process ends. Subsequently, the process advanced to S502 of FIG. 9.

In S502 the application 30 issues a command to the printer driver 50 to perform a print based on the layout created in S501. The document data undergoing this process by the layout creating function 33 is transmitted to the printer driver 50 by the command function 34. Specifically, the application 30 transmits the laid out document data to the printer driver 50 as a graphics device interface (GDI) function through the graphics engine 40. The process of S502 is executed by the command function 34 of the application 30. When the laid out document data is transmitted to the printer driver 50 through the graphics engine 40, the reducing function 41 of the graphics engine 40 reduces the document data using the reduction ratio calculated by the reduction ratio calculating function 54. Subsequently, the process advances to S601 of FIG. 11.

Figure 11:
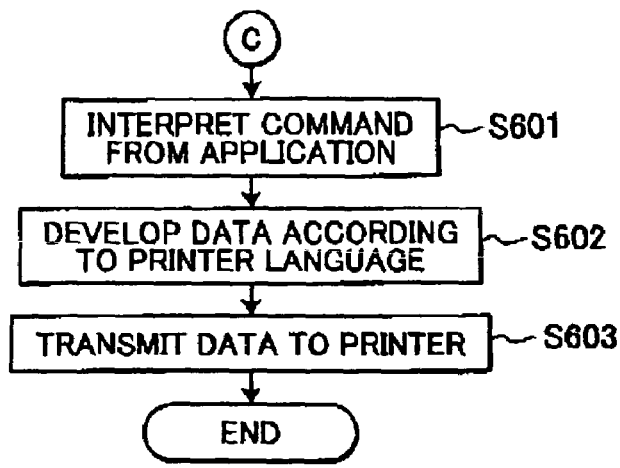
FIG. 11 is a flowchart showing steps in a printing process executed by the printer driver 50 based on the layout created by the application 30.

FIG. 11 is a flowchart showing the procedure by the printer driver 50 to perform a printing process based on the layout created by the application 30.

The printer driver 50 converts the document data transmitted from the application 30 into PDL data that is suitable for printing.

In S601 the drawing function 57 interprets the command based on the function received from the application 30. In this embodiment, the GDI function received from the application 30 is converted to a device driver interface (DDI) function by the graphics engine 40. Hence, the drawing function 57 interprets the command based on the DDI function received from the graphics engine 40 and then performs a pre-process to change the command into PDL.

In S602 the developing function 58 develops (rasterizes) the interpreted command content into PDL data.

In S603 the developed data suitable for a PDL print is supplied to the printer 7 via the communication cable 9.

Figure 12:
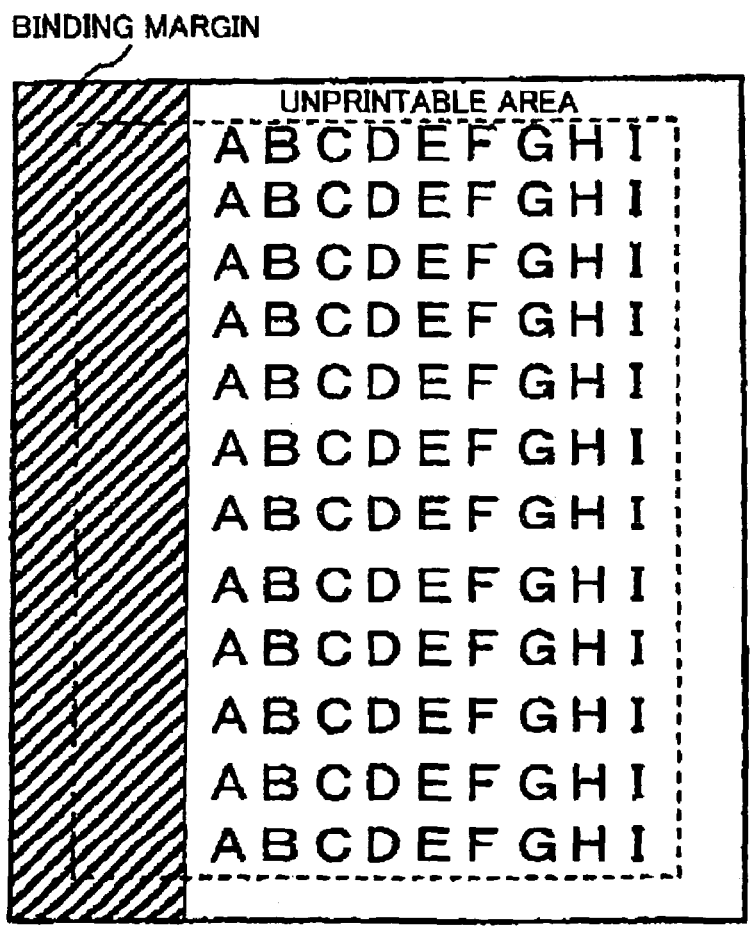
FIG. 12 is a plan view showing one example of a printing operation performed by the printing system 100 according to the first embodiment.
Figure 13:
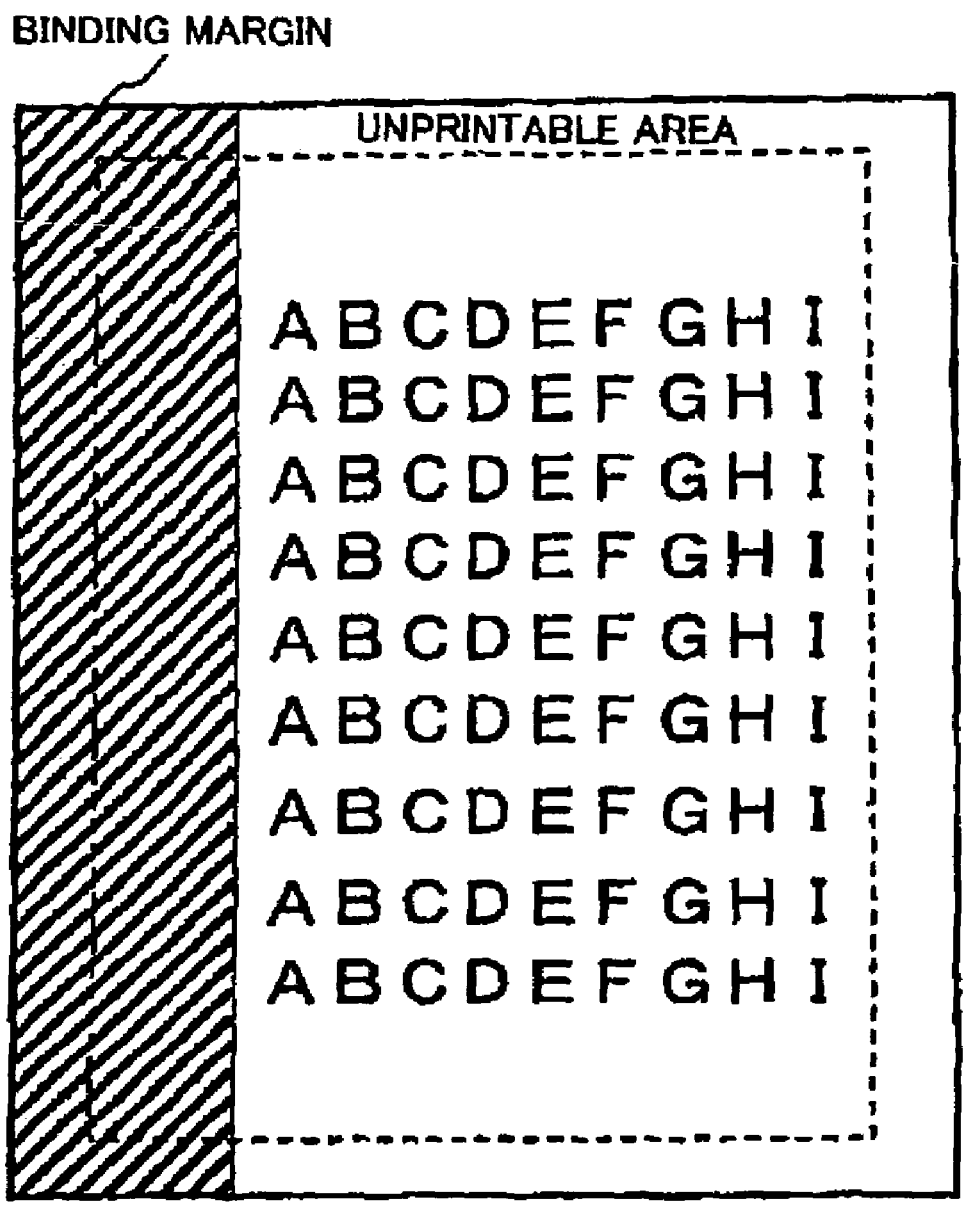
FIG. 13 is a plan view showing one example of a printing operation according to the conventional printing system.

FIG. 12 is a plan view showing the printed sheet by the printing process described above. FIG. 13 is a plan view showing the printed sheet by a conventional printing system. In the printed sheet shown in FIG. 13, the document data is printed by reducing the document data with the reduction ratio which is calculated in order that the original printable area can be reduced within the post-process area while maintaining the aspect ratio. When the printed sheet of FIG. 12 is compared with the printed sheet of FIG. 13, it is obvious that the blank area formed on the conventionally printed sheet is not formed on the top and bottom of the sheet in this embodiment. In other words, referring to FIG. 13, the blank area which is neither the binding are nor the unprintable area remains on the upper and lower portions in the printable area of the sheet.

On the other hand, referring to FIG. 12, the entire area on the sheet other than the binding area and the unprintable area is used for printing the document data. The printing method of this embodiment is able to eliminate these unnecessary spaces because the application 30 creates a layout in the virtual print area provided by the printer driver 50. In other words, the application 30 arranges document data from subsequent pages in areas that become spaces in the conventional example.

Through the process described above, the printer 7 can perform a printing operation to achieve a printed product conforming to the user's expectations. The printable area of the sheet can be effectively used for printing reduced document data with avoid producing unnecessary spaces, when the user has selected the binding option. In other words, the printing system 100 avoids the generation of unnecessary spaces on the printed sheet, even when the printable area of the sheet is modified by settings for margin areas.

The printing system 100 prevents objects in documents from being cut off in the middle when printed on the sheet.

The printing system 100 can effectively use the printable area on the sheet, when the document includes a mix of text, photos, or graphics.

The printing system 100 enables the user to perform different types of printing operation while maintaining the original layout of the document data.

Next, the second embodiment of the operation of the printing system 100 will be described when the user selects the N-in-1 print option. In this embodiment, the N-in-1 printing option is selected by the user. When printing a document, the user opens a window on the display 16 and sets the N-in-1 printing option through the print option setting function 51a.

In this embodiment, the post-process print area calculating function 53 calculates the area in which the document data is actually printed when the user selects the N-in-1 printing option.

First, as shown in FIG. 3, the sheet size is set by the user operation through the application 30, and then transmitted to the printer driver 50.

Figure 14:
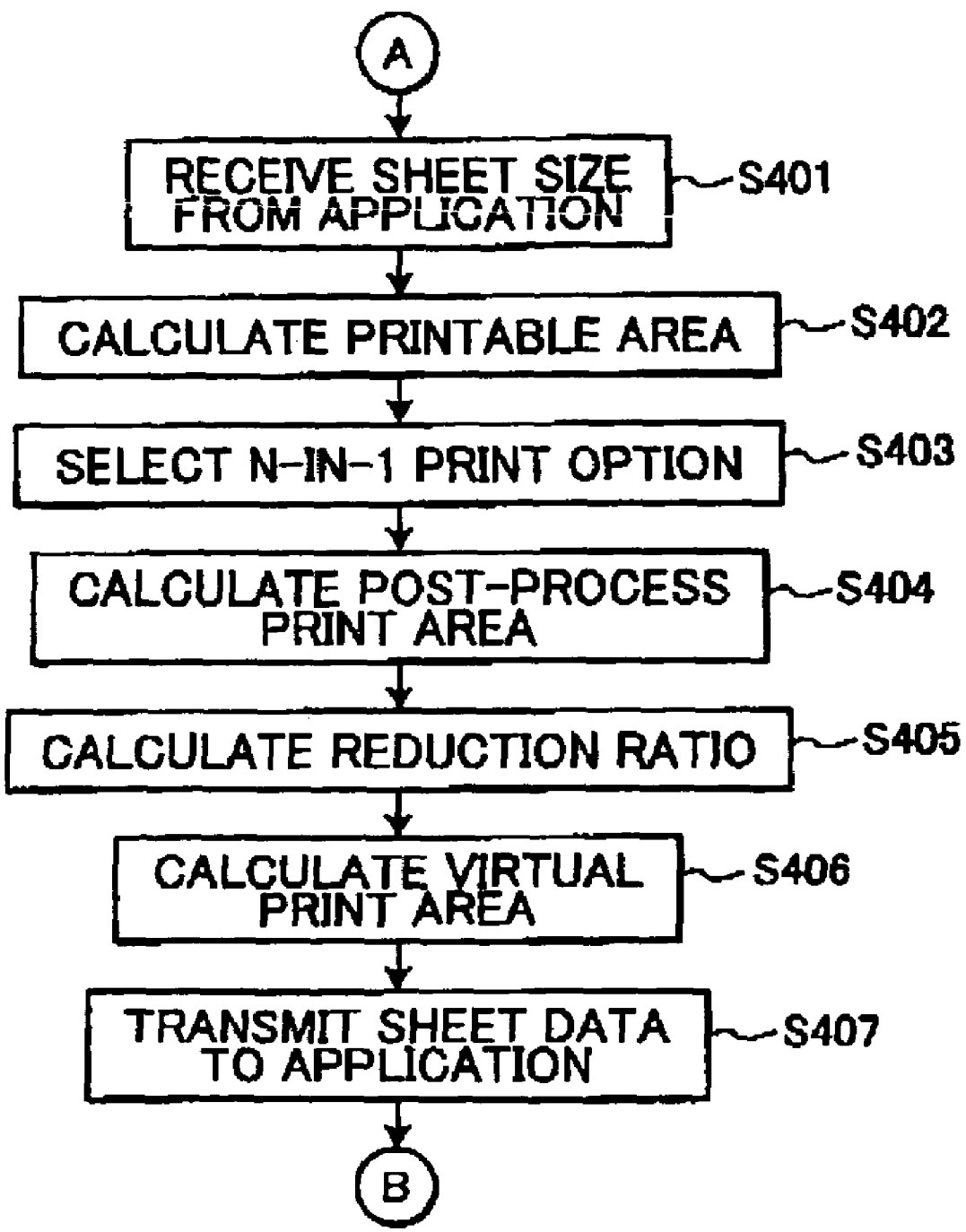
FIG. 14 is a flowchart showing the steps in a process executed by the printer driver 50 in response to a sheet size received from the application 30 in a second embodiment.

Subsequently, a process shown in FIG. 14 is performed by the printer driver 50. The process of FIG. 14 is similar to the process of FIG. 4 which is performed when a biding margin option is selected.

Referring to FIG. 14, in S401 the sheet size acquiring function 51 of the printer driver 50 receives the sheet size from the application 30.

In S402 the printable area calculating function 52 calculates the printable area that is predetermined for the acquired sheet size. As shown in FIG. 5, the dimensions of the sheet are indicated as 11 inches vertically and 8.5 inches horizontally. Since the dimension of the unprintable area on the top and bottom of the sheet is ⅙ inches and the dimension of the unprintable area on the left and right sides of the sheet is ¼ inches then the dimensions of the printable area are 8 inches horizontally (8.5 inches–¾ inches) and 64/6 inches vertically (11 inches–⅖ inches).

In S403 the user can set the N-in-1 printing option in a window displayed on the display 16 when executing a printing operation. The N-in-1 print option is selected by the user operation through the print option setting function 51a. The print option setting function 51a asks the user to enter the number of N.

Figure 15:
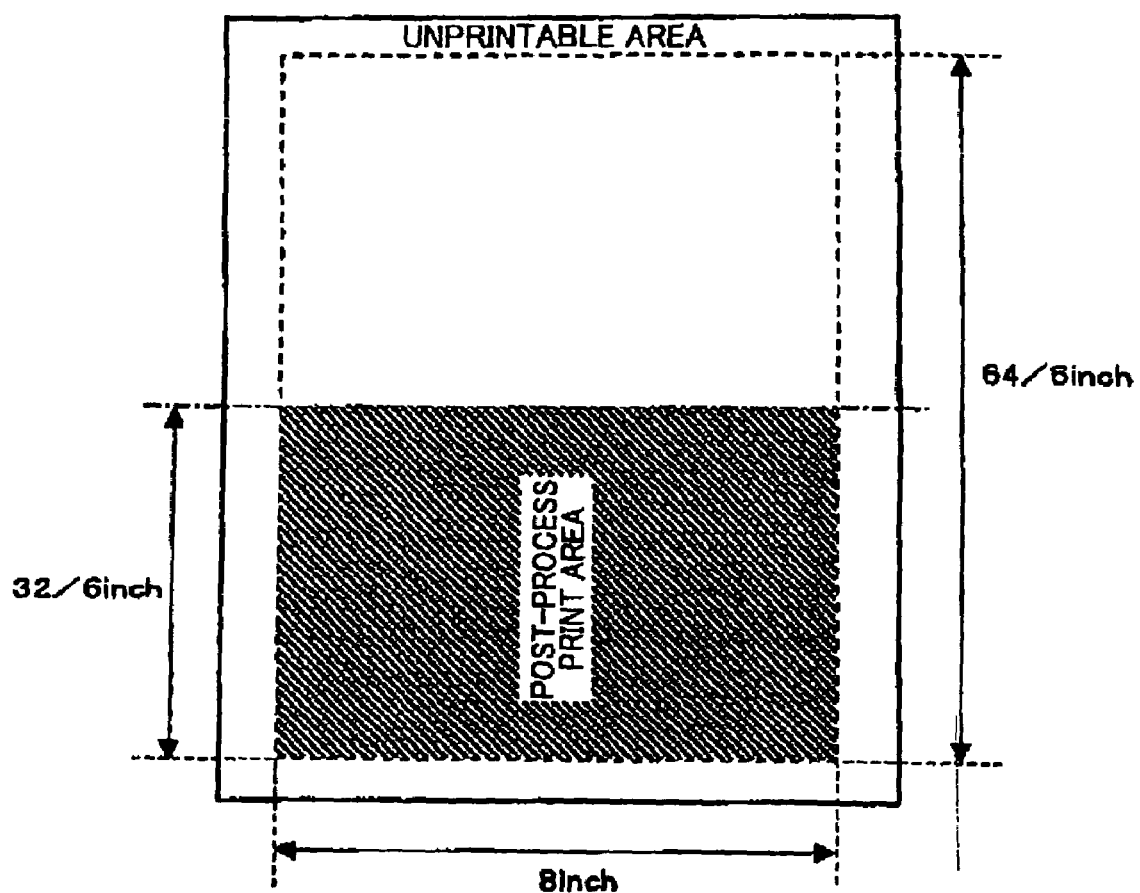
FIG. 15 is a plan view showing an example of a post-process print area according to the second embodiment.

In S404 the post-process print area calculating function 53 calculates the area within the printable area that can actually be printed when the N-in-1 printing function has been set. When the user enters 2 as the number of N in the N-in-1 printing option, the post-process print area calculating function 53 calculates the post-process print area by setting the vertical dimension of the printable area to one-half the current size. FIG. 15 is a plan view showing an example of the post-process print area when the 2-in-1 printing option has been selected. In this embodiment, the post-process print area has been calculated as 8 inches vertically and 32/6 inches. (64/16 inches×½) horizontally.

Figure 16:
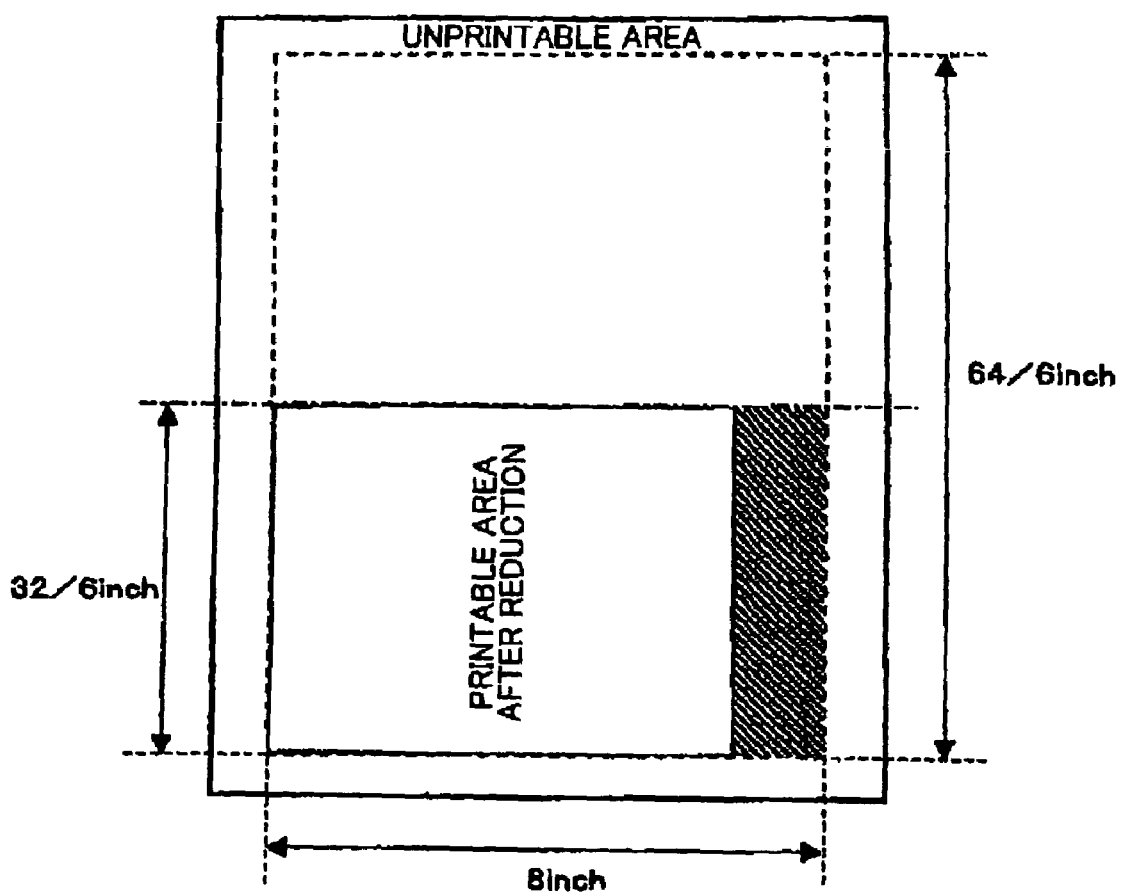
FIG. 16 is a plan view showing the printable area according to the second embodiment that has been reduced while maintaining the aspect ratio thereof.

In S405 the reduction ratio calculating function 54 calculates the reduction ratio for the printable area in order that the printable area can be reduced maintaining the aspect ratio thereof to achieve the maximum occupation within the post-process print area. FIG. 16 is a plan view showing the printable area which is reduced while maintaining the aspect ratio thereof. In this embodiment, since both the vertical and horizontal dimensions of the post-process print area in FIG. 15 have been modified from the dimensions of the printable area, the reduction ratio calculating function 54 determines which reduction ratio is smaller, the vertical one or the horizontal one. In FIG. 16, the horizontal reduction ratio of 32/48 is obtained by dividing the 32/6-inch horizontal dimension of the post-process print area by the 8-inch horizontal dimension of the printable area, the vertical reduction ratio of 48/64 is obtained by dividing the 8 inch vertical dimension of the post-process print area by the 64/6 inch vertical dimension of the printable area. Since 32/48 is smaller than 48/64, the horizontal reduction ratio of 32/48 reduces the printable area to achieve the maximum occupation within the post-process print area while maintaining the aspect ratio of the printable area. Accordingly, the reduction ratio calculating function 54 calculates the reduction ratio to be 32/48.

Figure 17:
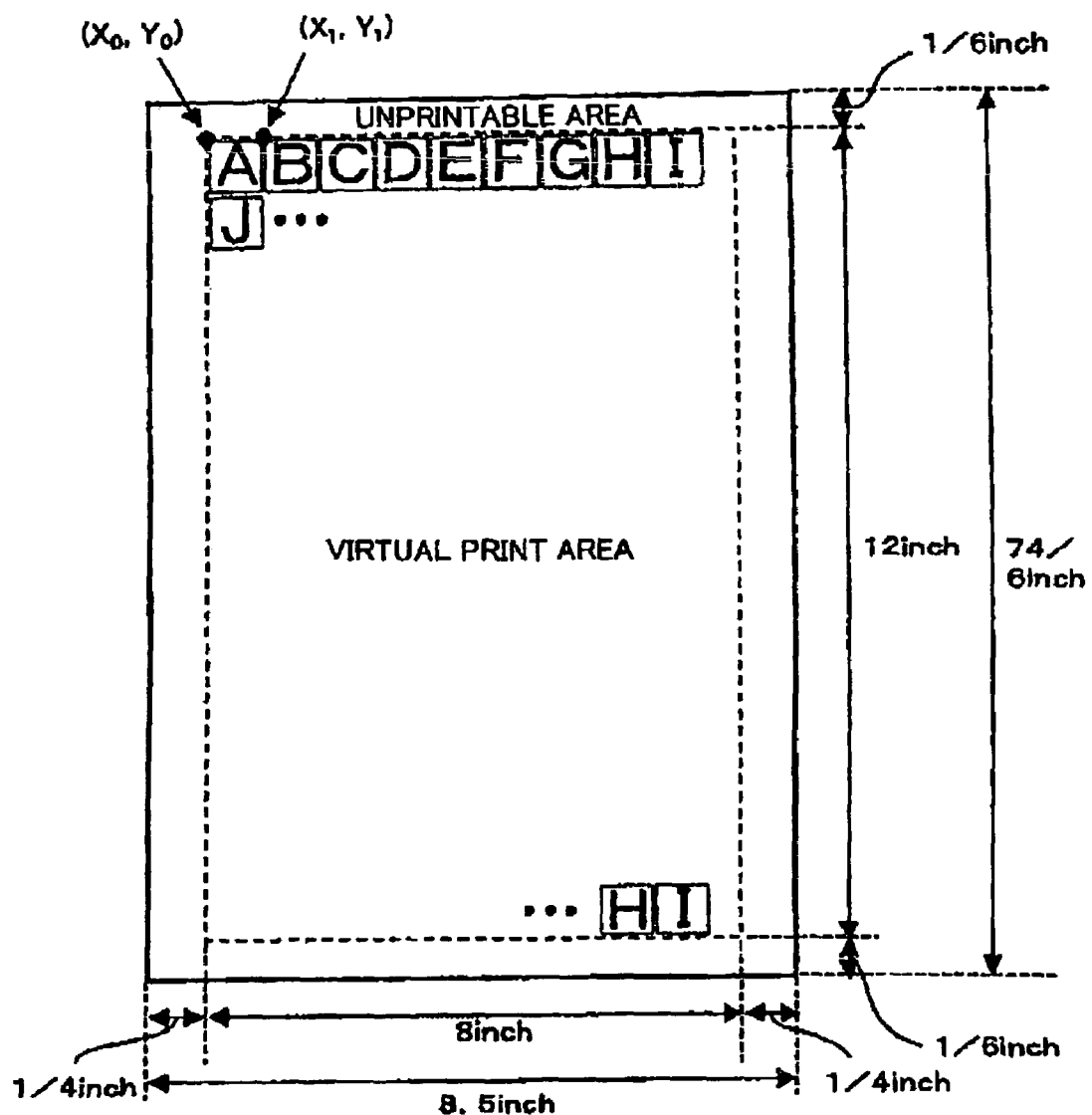
FIG. 17 is a plan view showing a virtual print area according to the second embodiment.

In S406 of FIG. 14, the virtual print area calculating function 55 calculates the virtual print area by dividing the post-process print area by the reduction ratio. FIG. 17 shows the virtual print area obtained by the virtual print area calculating function 55. In other words, by dividing the 32/6-inch horizontal dimension and the 8-inch vertical dimension of the post-process print area by the reduction ratio of 32/48, respectively, the virtual print area calculating function 55 calculates the virtual print area to be 8 inches wide and 12 inches long.

In S407 of FIG. 14, the printer driver 50 sends the reduction ratio, the dimensions of the virtual print area, and the dimensions of the virtual sheet size to the application 30 via the graphics engine 40. In this embodiment, the dimensions of the virtual sheet size are 8.5 inches wide and 74/6 inches long, as shown in FIG. 17. When this data is sent to the application 30, the reduction ratio is stored in the graphics engine 40. Subsequently, the process advances to S501 of FIG. 9. The subsequent process is the same as that of the first embodiment in which the binding margin option is selected.

Figure 18:
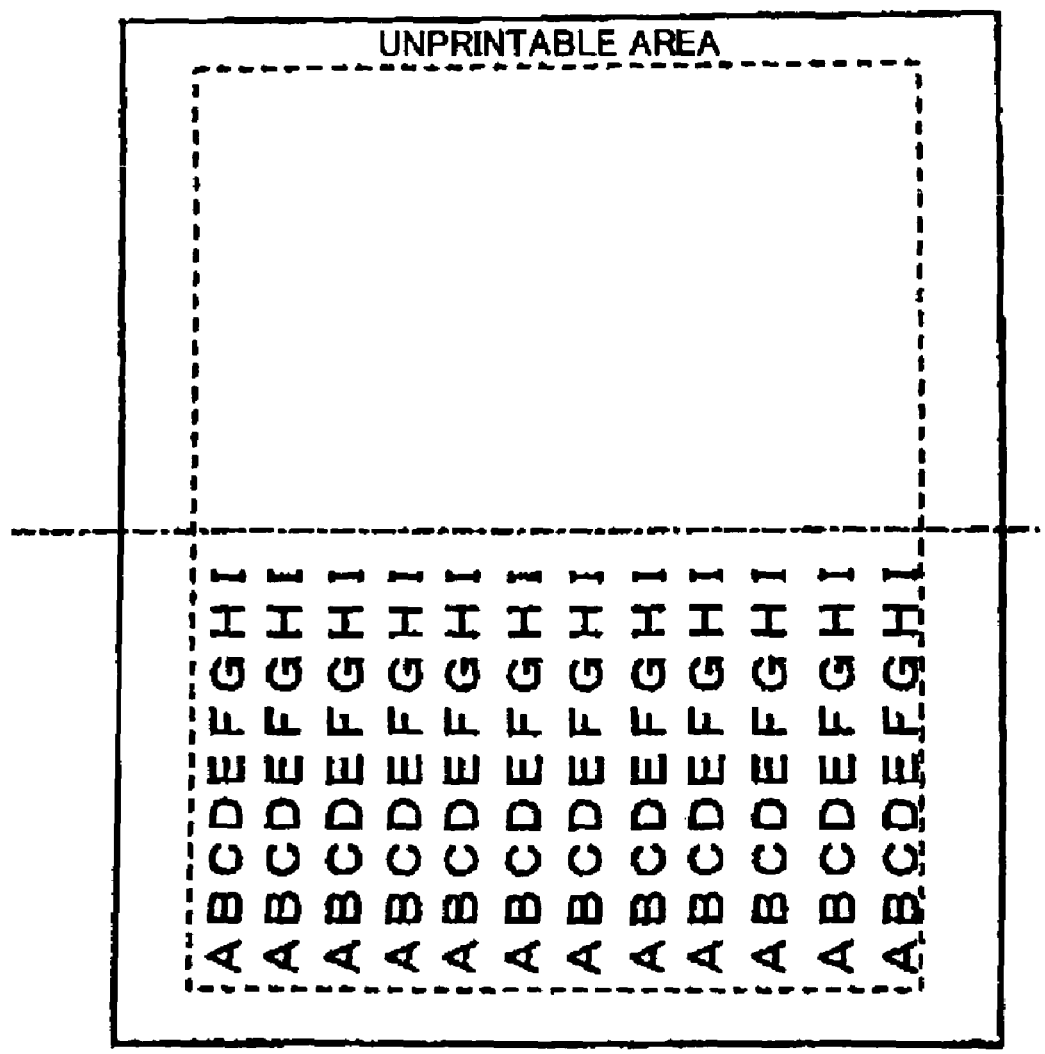
FIG. 18 is a plan view showing an example of a printing operation performed by the printing system 100 according to the second embodiment.
Figure 19:
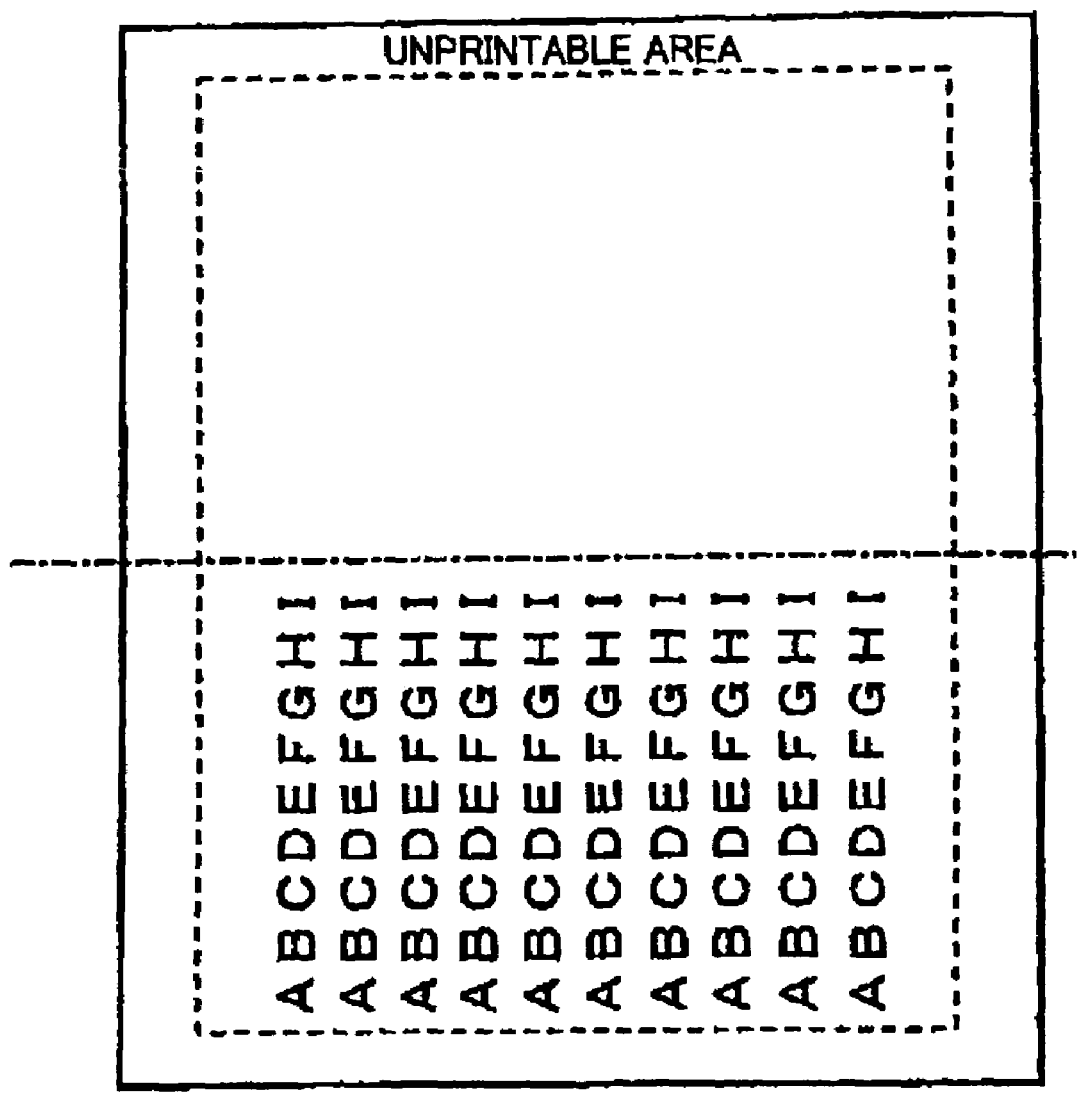
FIG. 19 is a plan view showing an example of a printing operation according to the conventional system.

FIG. 18 is a plan view showing the printed sheet by the printing process described above. FIG. 19 is a plan view showing the printed sheet by a conventional printing system. In the printed sheet shown in FIG. 18, the document data is printed by reducing the document data with the reduction ratio which is calculated in order that the original printable area can be reduced within the post-process area while maintaining the aspect ratio. When the printed sheet of FIG. 18 is compared with the printed sheet of FIG. 19, it is obvious that the blank area formed on the left and right of the sheet (the upper and lower portions on the divided sheet) by the conventional printing system is not formed on the left and right of the sheet in this embodiment. In other words, referring to FIG. 19, the blank area which is not the unprintable area is generated in the printable area of the sheet.

On the other hand, referring to FIG. 18, the entire area on the sheet other than the unprintable area is used for printing 2 pages worth of document data on a single sheet of sheet.

The printing method of this embodiment is able to eliminate these unnecessary spaces because the application 30 creates a layout in the virtual print area provided by the printer driver 50. In other words, the application 30 arranges document data from subsequent pages in areas that become spaces in the conventional example.

Through the process described above, the printer 7 can perform a printing operation to achieve a printed product conforming to the user's expectations. The printable area of the sheet can be effectively used for printing reduced document data with avoid producing unnecessary spaces, when the user has selected the N-in-1 print option. In other words, the printing system 100 avoids the generation of unnecessary spaces on the printed sheet The printing system 100 prevents objects in documents from being cut off in the middle when printed on the sheet.

The printing system 100 can effectively use the printable area on the sheet, when the document includes a mix of text, photos, or graphics.

The printing system 100 enables the user to perform different types of printing operation while maintaining the original layout of the document data.

Next, the third embodiment of the operation of the printing system 100 will be described when the user selects the simple scaling option. In this embodiment, the simple scaling option is selected by the user. When printing a document, the user opens a window on the display 16 and sets the simple scaling option through the print option setting function 51a.

In this embodiment, the user can establish a binding margin, or enter the command to divide a sheet into N portions to print N pages worth of document data in the sheet.

First, as shown in FIG. 3, the sheet size is set by the user operation through the application 30, and then transmitted to the printer driver 50.

Figure 20:
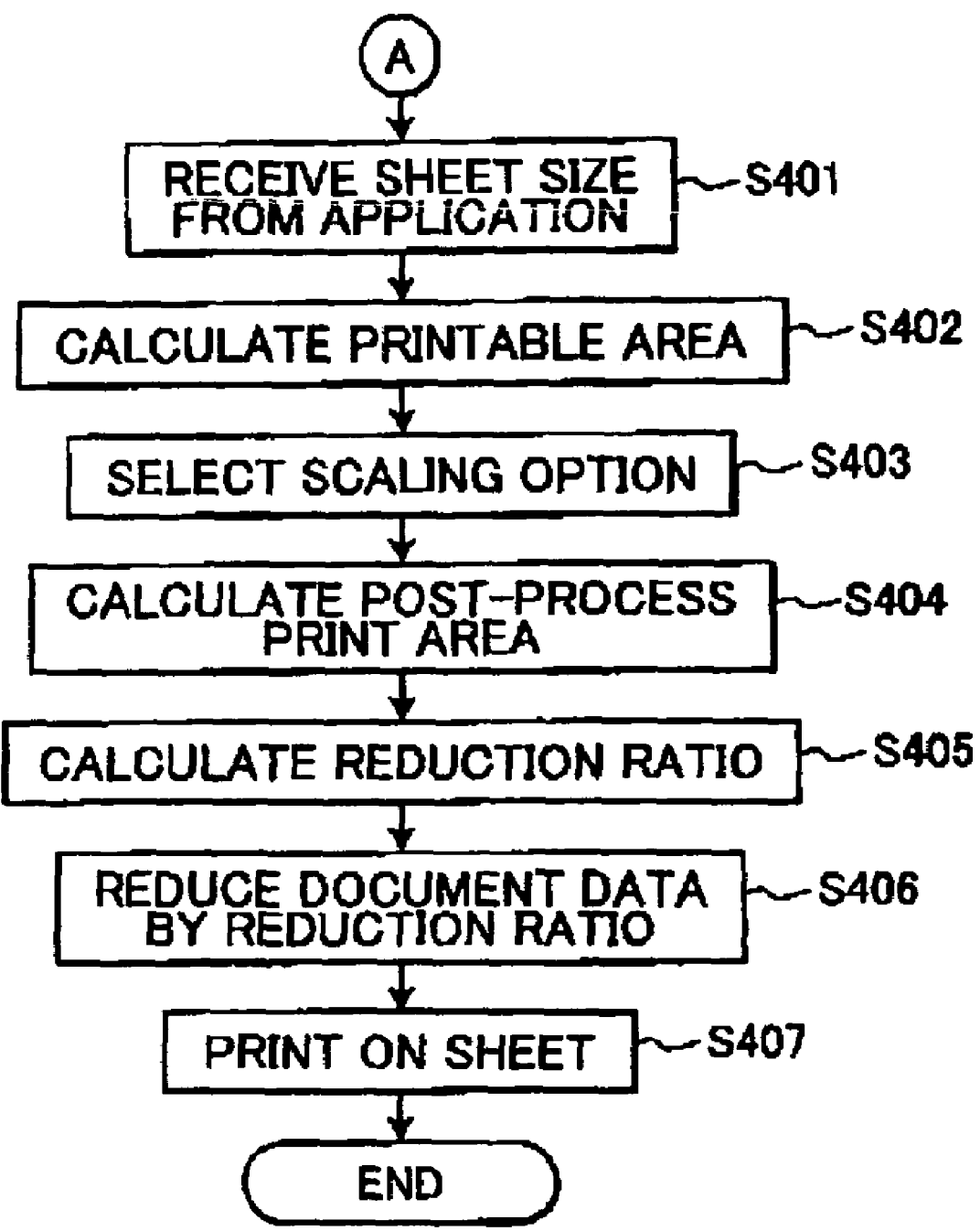
FIG. 20 is a flowchart showing the steps in a process executed by an application 30 according to a third embodiment.

Subsequently, a process shown in FIG. 20 is performed by the printer driver 50.

Referring to FIG. 20, in S401 the sheet size acquiring function 51 of the printer driver 50 receives the sheet size from the application 30.

In S402 the printable area calculating function 52 calculates the printable area that is predetermined for the acquired sheet size.

In S403 the user can set the simple scaling option in a window displayed on the display 16 when executing a printing operation. The simple scaling option is selected by the user operation through the print option setting function 51a. The print option setting function 51a asks the user to enter a binding margin or a desired printing area.

In S404 the post-process print area calculating function 53 calculates the area within the printable area that can actually be printed, the post-process print area. The post-process print area is obtained by subtracting the overlapped area between the printable area and the binding area from the printable area.

In S405 the reduction ratio calculating function 54 calculates the reduction ratio for the printable area in order that the printable area can be reduced maintaining the aspect ratio thereof to achieve the maximum occupation within the post-process print area.

In S406 the printer driver reduces the document data transmitted from the application 30 by the reduction ratio. In S407, the reduced document data is printed on the sheet by the printer 7 in order to avoid the reduced document data from printing on the binding margin.

With this construction, the printing system 100 can print the reduced document data without laying out the document data using the layout creating function 33 of the first and second embodiments.

As described above, the printing system 100 can perform a printing operation in the option selected by the user.

While the invention has been described in detail with reference to specific embodiments thereof, it would be apparent to those skilled in the art that many modifications and variations may be made therein without departing from the spirit of the invention, the scope of which is defined by the attached claims.

For example, while the objects shown in the drawings of the embodiment described above represent only text, these objects may also be photographs or graphics. Further, the dimensions of various areas, including the dimensions of the sheet size, the dimensions of the unprintable areas, and the dimensions of the binding area, may be modified as needed.

The disclosure of Japanese Patent Application No. 2003-305685 filed Aug. 29, 2003 including specification, drawings, and claims is incorporated herein by references in its entirety.

What is claimed is:

1. A print controller comprising:
   a first area calculating unit that subtracts an unprintable area from a sheet to calculate a first area having a prescribed aspect ratio;
   a margin setting unit that sets a margin in the sheet;
   a second area calculating unit that subtracts an overlapped area between the margin and the first area from the first area to calculate a second area;
   a reduction ratio calculating unit that calculates a reduction ratio of the first area so that the first area can be reduced while maintaining the prescribed aspect ratio to achieve a maximum occupation within the second area;
   a third area calculating unit that divides the second area by the reduction ratio to calculate a third area which is broader than the second area;
   a laying out unit that sets the third area as a printable area to lay out document data within the third area; and
   a first print commanding unit that reduces the document data laid out in the third area by the reduction ratio to issue a command for printing the reduced document data on the second area.

2. The print controller according to claim 1, wherein the margin includes a binding area.

3. The print controller according to claim 1, wherein the laying out unit comprises:
   an object size calculating unit that determines a size of an object in the document data;
   a determining unit that compares the size of the object determined by the object size calculating unit to a size of the third area to determine whether the third area accommodates the object; and
   an arranging unit that arranges the object in the third area on a subsequent sheet to the sheet when the determining units determines that the third area on the sheet does not accommodate the object.

4. The print controller according to claim 3, further comprising a coordinate calculating unit that calculates a coordinate at which the object is to be arranged in the third area;
   wherein the determining unit determines whether the third area accommodates the object when the object is arranged at the coordinates calculated by the coordinate calculating unit.

5. The print controller according to claim 3, wherein the object includes text, a photograph, or a graphics.

6. The print controller according to claim 1, further comprising:
   a second print commanding unit that reduces the document data by the reduction ratio before the document data is laid out by the first laying out unit, and then issues a command to print the reduced document data in the second area; and
   a selecting unit that selects one of a printing mode for printing according to a command from the first print commanding unit, and a printing mode for printing according to a command from the second print commanding unit.

7. A print controller comprising:
   a first area calculating unit that subtracts an unprintable area from a sheet to calculate a first area having a prescribed aspect ratio;
   a divided print setting unit that selects a divided print to print on an area of the sheet divided by a number of N;
   a second area calculating unit that multiplies the first area by a ratio of 1/N to calculate a second area;
   a reduction ratio calculating unit that calculates a reduction ratio for the first area so that the first area can be reduced while maintaining the aspect ratio to achieve a maximum occupation in the second area;
   a third area calculating unit that divides the second area by the reduction ratio to calculate a third area which is broader than the second area;
   a laying out unit that lays out document data in the third area as a printable area; and
   a first print commanding unit that reduces the document data in the third area laid out by the laying out means by the reduction ratio to issue a command to print the reduced document data in the second area.

8. The print controller according to claim 7, wherein the laying out unit comprises:
   an object size calculating unit that determines a size of an object in the document data;
   a determining unit that compares the size of the object determined by the object size calculating unit to a size of the third area to determine whether the third area accommodates the object; and
   an arranging unit that arranges the object in the third area on a subsequent sheet to the sheet when the determining units determines that the third area on the sheet does not accommodate the object.

9. The print controller according to claim 8, further comprising a coordinate calculating unit that calculates a coordinate at which the object is to be arranged in the third area;
   wherein the determining unit determines whether the third area accommodates the object when the object is arranged at the coordinates calculated by the coordinate calculating unit.

10. The print controller according to claim 8, wherein the object includes text, a photograph, or a graphics.

11. The print controller according to claim 7, further comprising:
    a second print commanding unit that reduces the document data by the reduction ratio before the document data is laid out by the first laying out unit, and then issues a command to print the reduced document data in the second area; and
    a selecting unit that selects one of a printing mode for printing according to a command from the first print commanding unit, and a printing mode for printing according to a command from the second print commanding unit.

12. A print controller comprising:
   means for subtracting an unprintable area from a sheet to obtain a printable area having an aspect ratio, the unprintable area having a width;
   means for setting a desired printing area within the printable area;
   means for calculating a reduction ratio for the printable area so that the printable area can be reduced while maintaining the aspect ratio to achieve a maximum occupation within the desired printing area;
   means for dividing the desired printing area by the reduction ratio to obtain a virtual area;
   means for laying out document data with the virtual area; and
   means for reducing the virtual area including the laid out document data by the reduction ratio to issue a command to print the reduced document data on the desired printing area.

13. The print controller according to claim 12, wherein the means for setting the desired printing area includes:
   means for selecting one of a margin setting and an N-in-1 setting, the margin setting being for setting a margin in the sheet, the margin having a broader width than the width of the unprintable area, the N-in-1 setting being for printing N pages worth of document in the sheet;
   means for subtracting an overlapped area between the margin and the printable area from the printable area to obtain the desired printing area when the margin setting is selected; and
   means for multiplying the printable area by a ratio of 1/N to obtain the desired printing area when the N-in-1 setting is selected.

14. The print controller according to claim 12, wherein the means for setting the desired printing area within the printable area includes:
   means for selecting one of a margin setting, an N-in-1 setting, and a scaling setting, the margin setting being for setting a margin in the sheet, the margin having a broader width than the width of the unprintable area, the N-in-1 setting being for printing N pages worth of document in the sheet, the scaling setting being for reducing one page of document data while maintaining an aspect ratio thereof to achieve a maximum occupation within the desired printing area; and
   means for issuing a command for printing the reduced page of document data on the desired printing area when the scaling setting is selected.

15. The print controller according to claim 12, wherein the document data includes a plurality of objects, each of the plurality of objects having a size, the means for laying out the document data includes:
   means for determining the size of one of the plurality of objects;
   means for comparing the determined size of the one of the plurality of objects to the printable area to determine whether the printable area accommodates the one of the plurality of objects; and
   means for arranging the one of the plurality of objects in the printable area on a subsequent sheet to the sheet when the printable area does not accommodate the one of the plurality of objects.

16. The print controller according to claim 15, further comprising;
   means for calculating a coordinate at which the one of the plurality of objects is to be arranged in the printable area; and
   means for determining whether the printable area accommodates the one of the plurality of objects when the one of the plurality of objects is arranged at the calculated coordinate.

17. The print controller according to claim 15, wherein the plurality of objects include text, a photograph, or a graphics.

* * * * *